(12) United States Patent
Tröster et al.

(10) Patent No.: US 11,874,878 B2
(45) Date of Patent: Jan. 16, 2024

(54) REPLACING COMPONENTS OF A DATA PROCESSING SYSTEM

(71) Applicant: International Business Machines Corporation, Armonk, NY (US)

(72) Inventors: Martin Tröster, Renningen (DE); Philip A. Sciuto, Poughkeepsie, NY (US); Daniel Johannes Klodt, Altdorf (DE); Michael Becht, Stuttgart (DE); Giovanni Cautillo, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/538,879

(22) Filed: Aug. 13, 2019

(65) Prior Publication Data
US 2021/0049216 A1  Feb. 18, 2021

(51) Int. Cl.
*G06F 16/903* (2019.01)
*G06F 16/901* (2019.01)
*G06F 16/9032* (2019.01)

(52) U.S. Cl.
CPC ...... *G06F 16/90335* (2019.01); *G06F 16/901* (2019.01); *G06F 16/9032* (2019.01)

(58) Field of Classification Search
CPC ............. G06F 16/90335; G06F 16/901; G06F 16/9032
See application file for complete search history.

(56) References Cited

U.S. PATENT DOCUMENTS

| | | | |
|---|---|---|---|
| 4,642,787 A | 2/1987 | McCarthy | |
| 8,577,487 B2 | 11/2013 | Tarte | |
| 8,677,342 B1 * | 3/2014 | Kidder | H04L 41/0806 709/224 |
| 9,488,947 B2 | 11/2016 | Shenoy | |
| 10,423,427 B1 * | 9/2019 | Hayward | G06F 9/54 |
| 2002/0037714 A1 * | 3/2002 | Takae | H04W 8/20 455/419 |
| 2004/0031030 A1 * | 2/2004 | Kidder | G06F 1/14 717/172 |

(Continued)

OTHER PUBLICATIONS

"Family Computer Disk System", Wikipedia, The Free Encyclopedia, <https://en.wikipedia.org/wiki/Family_Computer_Disk_System#Disk_Writer_and_Disk_Fax_kiosks>, This page was last edited on May 3, 2019, 6 pages.

(Continued)

*Primary Examiner* — Cam Y T Truong
(74) *Attorney, Agent, or Firm* — Stephen R. Yoder; Jared Montanaro

(57) ABSTRACT

A computer implemented method for replacing components of a data processing system, comprising in response to a detection of a newly added component at a specific location; reading its customization data from a data storage and querying a persistent database to determine if functional capabilities according to customization data are specified for this specific location; depending on a result of determining the functional capabilities and of querying the database if it contains customization data either: disabling the component; or enabling the component and storing in the database the customization data; or enabling the component and replacing the customization data in the database; or storing the customization data in the data storage of the component and enabling the component.

19 Claims, 5 Drawing Sheets

(56) References Cited

U.S. PATENT DOCUMENTS

| | | | |
|---|---|---|---|
| 2006/0064756 A1* | 3/2006 | Ebert | G06F 21/123 726/26 |
| 2006/0069835 A1* | 3/2006 | Arackal | G06F 13/4081 710/302 |
| 2006/0101456 A1* | 5/2006 | Crosier | H04L 41/0806 717/174 |
| 2008/0083827 A1* | 4/2008 | Ho | H04B 1/3816 235/380 |
| 2008/0189006 A1 | 8/2008 | Meehan | |
| 2010/0065628 A1* | 3/2010 | Carmichael | G06K 19/07 235/382 |
| 2010/0274600 A1 | 10/2010 | Shenoy | |
| 2010/0318881 A1* | 12/2010 | Limber | G06F 21/44 714/758 |
| 2011/0149114 A1* | 6/2011 | Tsujii | G06F 3/08 348/E5.024 |
| 2011/0208339 A1 | 8/2011 | Tarte | |
| 2014/0207569 A1* | 7/2014 | Lam | G06Q 20/28 705/14.51 |
| 2014/0325632 A1* | 10/2014 | De Jong | H04L 63/0853 726/9 |
| 2016/0300042 A1 | 10/2016 | Schaerz | |
| 2017/0060672 A1 | 3/2017 | Allen | |
| 2019/0230501 A1* | 7/2019 | He | H04W 12/35 |

OTHER PUBLICATIONS

"Nintendo Power (cartridge)", From Wikipedia, The Free Encyclopedia, <https://en.wikipedia.org/wiki/Nintendo_Power_(cartridge)>, This page was last edited on Jun. 4, 2019, 3 pages.

Schulzki-Haddouti, Christiane, "false counter, Car industry weakens fight against speedometer fraud", Heise Magazine, <https://www.heise.de/select/ct/2019/1/1546253627917701>, printed Jun. 11, 2019, 5 pages.

* cited by examiner

REPLACING COMPONENTS OF A DATA PROCESSING SYSTEM

BACKGROUND

The present invention relates in general to data processing systems, in particular, to a computer implemented method for replacing components of a data processing system, comprising replaceable components, wherein the components comprise a data storage for computer-readable customization data representing their respective functional capabilities, and wherein the functional capabilities can be enabled or disabled for use in the data processing system, as well as a computer program product and a data processing system.

Computer systems are composed of many components, namely, circuit boards or parts that can be easily removed from the computer system and replaced, even by someone lacking in-depth product knowledge of the computer system. These components typically include one or more of power supply units, motherboards, socketed microprocessors, primary storage modules (e.g., Random Access Memories, or RAMs), secondary storage devices (e.g., hard drives and optical drives), video cards, sound cards, I/O adapters and peripherals such as keyboards, mice and printers.

Many of these components have Vital Product Data (VPD) stored thereon that is used during the setup or configuration of the computer system. The VPD is a collection of configuration and informational data associated with a particular set of hardware (e.g., a component), to allow for the component to be administered at a system or network level. VPD may include product model numbers, unique serial numbers, product release levels, maintenance levels, and other information specific to the hardware, as well as user-defined information, such as the building and department location of the hardware.

SUMMARY

A computer implemented method is proposed for replacing components of a data processing system comprising replaceable components, wherein the components comprise a data storage for computer-readable customization data representing their respective functional capabilities, and wherein the functional capabilities can be enabled or disabled for use in the data processing system. The method comprises (i) in response to a detection of a newly added component at a specific location in the data processing system reading its customization data from the data storage and querying a persistent database in the data processing system to determine if the functional capabilities according to the customization data are specified for this specific location; (ii) depending on a result of determining the functional capabilities according to the customization data specified for this specific location and of querying the database if it contains any customization data for the same specific location in the data processing system already, either a) in case, the data storage of the component does not contain customization data and the database does not contain customization data for a similar component, disabling the component at the specific location; or b) in case, the data storage of the component contains customization data and the database does not contain customization data for a similar component, enabling the respective functional capabilities of this component and storing in the database the customization data of the newly added component together with data representing its specific location in the data processing system; or c) in case, the data storage of the component contains customization data and the database contains customization data, enabling the respective functional capabilities of this component and replacing the customization data of the database with the customization data of the newly added component; or d) in case, the data storage of the component does not contain customization data and the database contains customization data for a similar component, storing the customization data in the data storage of the newly added component and enabling the respective functional capabilities of this component.

Advantageously a transparent and non-interactive method may be proposed to customize generic replacement hardware into a specific function based on persisted information about what type and function was last plugged in the same plug position in a computer system. The computer system may be a data processing system extendable with additional adapters, e.g., input/output adapters.

Further asset protection may advantageously be provided correlating empty customization write attempts and error callouts to prevent unintended customization of parts.

Further, a computer program product is proposed for replacing components of a data processing system comprising replaceable components, wherein the components comprise a data storage for computer-readable customization data representing their respective functional capabilities, and wherein the functional capabilities can be enabled or disabled for use in the data processing system.

The computer program product comprises a computer readable storage medium having program instructions embodied therewith, the program instructions executable by the computer system to cause the computer system to perform a method comprising: (i) in response to a detection of a newly added component at a specific location in the data processing system reading its customization data from the data storage and querying a persistent database in the data processing system to determine if the functional capabilities according to the customization data are specified for this specific location; (ii) depending on a result of determining the functional capabilities according to the customization data specified for this specific location and of querying the database if it contains any customization data for the same specific location in the data processing system already, either a) in case, the data storage of the component does not contain customization data and the database does not contain customization data for a similar component, disabling the component at the specific location; orb) in case, the data storage of the component contains customization data and the database does not contain customization data for a similar component, enabling the respective functional capabilities of this component and storing in the database the customization data of the newly added component together with data representing its specific location in the data processing system; or c) in case, the data storage of the component contains customization data and the database contains customization data, enabling the respective functional capabilities of this component and replacing the customization data of the database with the customization data of the newly added component; or d) in case, the data storage of the component does not contain customization data and the database contains customization data for a similar component, storing the customization data in the data storage of the newly added component and enabling the respective functional capabilities of this component.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
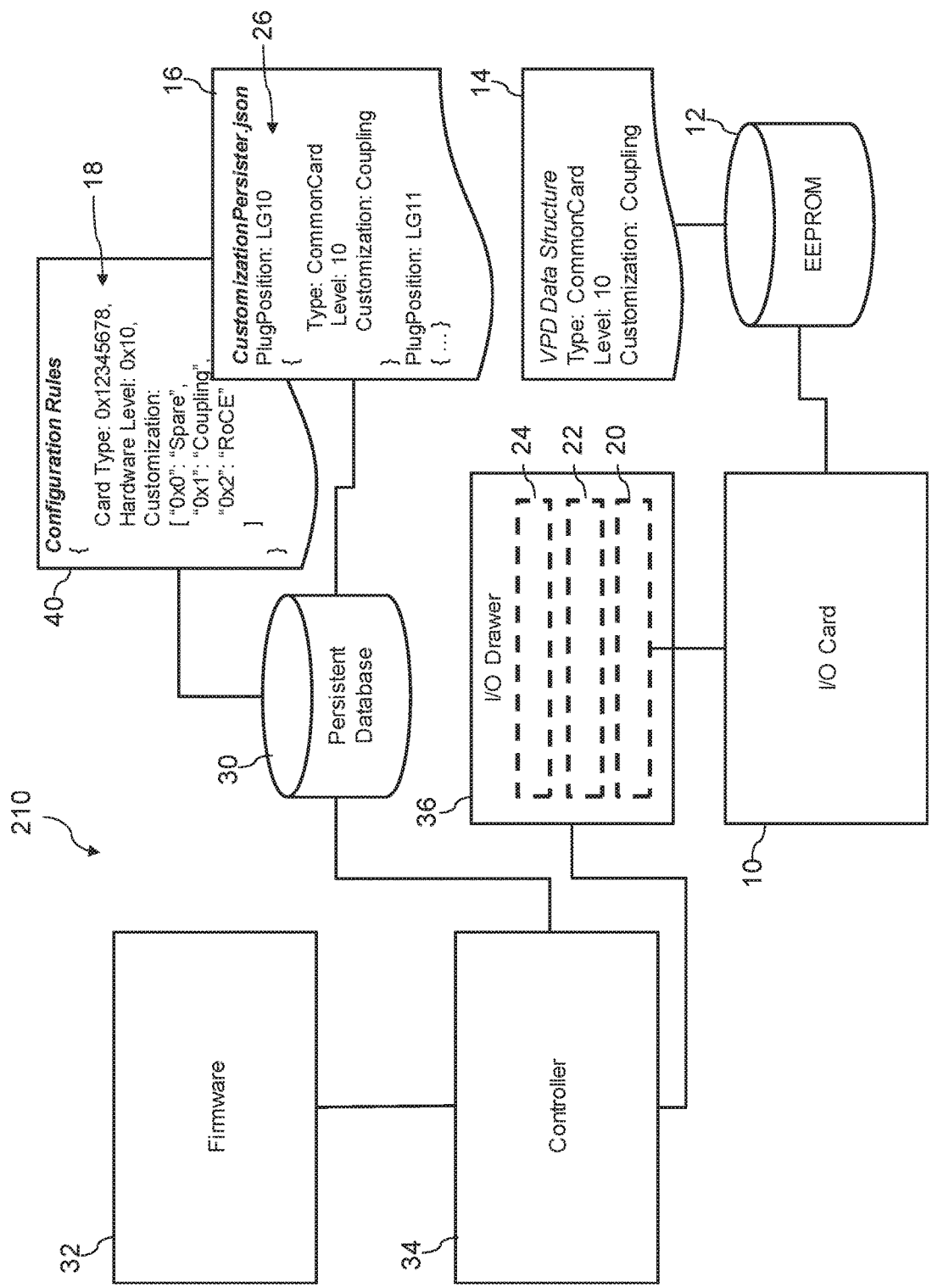
FIG. 1 depicts schematics of a data processing system with involved hardware and firmware components according to an embodiment of the invention for replacing components of the data processing system comprising replaceable components, wherein the components comprise a data storage for computer-readable customization data representing their respective functional capabilities.

Currently, if the VPD of a component is corrupted, the component cannot be used even if the physical hardware of the component is functioning properly. In addition, since the VPD is not replaceable, users need to buy a new component if the VPD becomes corrupted. While existing mechanisms to protect the VPD are available, most require the addition of redundant hardware to the component that increases the cost of the component.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for replacing components of a data processing system comprising replaceable components, wherein the components comprise a data storage for computer-readable customization data representing their respective functional capabilities, and wherein the functional capabilities can be enabled or disabled for use in the data processing system.

The illustrative embodiments may be used for the proposed method comprising (i) in response to a detection of a newly added component at a specific location in the data processing system reading its customization data from the data storage and querying a persistent database in the data processing system to determine if the functional capabilities according to the customization data are specified for this specific location; (ii) depending on a result of determining the functional capabilities according to the customization data specified for this specific location and of querying the database if it contains any customization data for the same specific location in the data processing system already, either a) in case, the data storage of the component does not contain customization data and the database does not contain customization data for a similar component, disabling the component at the specific location; or b) in case, the data storage of the component contains customization data and the database does not contain customization data for a similar component, enabling the respective functional capabilities of this component and storing in the database the customization data of the newly added component together with data representing its specific location in the data processing system; or c) in case, the data storage of the component contains customization data and the database contains customization data, enabling the respective functional capabilities of this component and replacing the customization data of the database with the customization data of the newly added component; or d) in case, the data storage of the component does not contain customization data and the database contains customization data for a similar component, storing the customization data in the data storage of the newly added component and enabling the respective functional capabilities of this component.

FIG. 1 depicts schematics of a data processing system 210 with involved hardware and firmware components according to an embodiment of the invention for replacing components 10 of the data processing system 210 comprising replaceable components 10, wherein the components comprise a data storage 12 for computer-readable customization data 14, representing their respective functional capabilities. The functional capabilities can be enabled or disabled for use in the data processing system 210. The embodiment depicted in FIG. 1 for simplicity only exhibits one component 10.

The schematics of the data processing system 210 depicted in FIG. 1 comprise a controller 34 with a firmware 32. The controller is connected to an input/output drawer 36 with specific plug positions as specific locations 20, 22, 24 for components 10.

As an example, the specific location 20 in the data processing system 210 may be an input/output adapter, particularly a PCI Express adapter, such that an input/output card 10 may be plugged in the plug position 20. A persistent database 30 is connected to the controller 34 comprising configuration rules 40 for possible components 10 with different customization, e.g., "Spare", "Coupling", "RoCE", to be used with the data processing system 210 with different customization data 16. "Spare", e.g., may be used for spare parts, "Coupling" for long distance coupling, "RoCE" for Remote Direct Memory Access Over Converged Ethernet. The persistent database 30 also comprises customization data 16 for different components 10 which have been used in different plug positions 20, 22, 24 as is indicated in the customization data 16 with data 26 representing the specific location 20, 22, 24.

The input/output card as component 10 comprises a data storage 12, e.g. in an Electrically Erasable Programmable Read-Only Memory (EEPROM), for computer-readable customization data 14 representing its respective functional capabilities, which can be enabled or disabled for use in the data processing system 210. This data storage 12 contains Vital Product Data (VPD) comprising customization data 14, as e.g. a component type "CommonCard", a hardware level "10" and a customization type "Coupling". Thus the customization data 14 of the component 10 may be part of the VPD of the component 10.

According to embodiments of the invention a single Part Number may be defined for a card 10 representing all given functions.

A field (record) may be defined in the card EEPROM 12 which contains function specific customization information 14. Initially this field may be set to zero during the card assembly process.

Function specific customization information 14 may be written at any point before shipping the card to the customer for installing it into a data processing system 210, which may be executed as part of a new data processing system 210 or as an upgrade to an existing data processing system 210.

The firmware 32 installed on the data processing system 210 requires any such card 10 to be properly customized and prevents the operation of a non-customized card 10. For any card 10 of this type, the firmware 32 may persist the specific customization information 14 on a local controller 34 or medium and may associate this information 14 with the card's plug position 20 in the data processing system 210.

The spare parts stock may also use the non-customized versions of the card 10, effectively avoiding the redundant stocking of cards 10.

During replacement of a card 10 in the customer data processing system 210, a non-customized spare part may be installed in the same plug position as a specific location 20 as the original card, e.g. a potentially defective card as part of a repair action.

The firmware 32 may detect the installation of a non-customized spare card 10 in the data processing system 210. The firmware 32 may check the last known type of card 10 plugged in the same plug position 20. If that last card was of the same type as the newly installed spare card 10, the previous customization value 16 of that card 10 may be written into the VPD 12 of the spare card 10, effectively customizing it to the same function.

Figure 2:
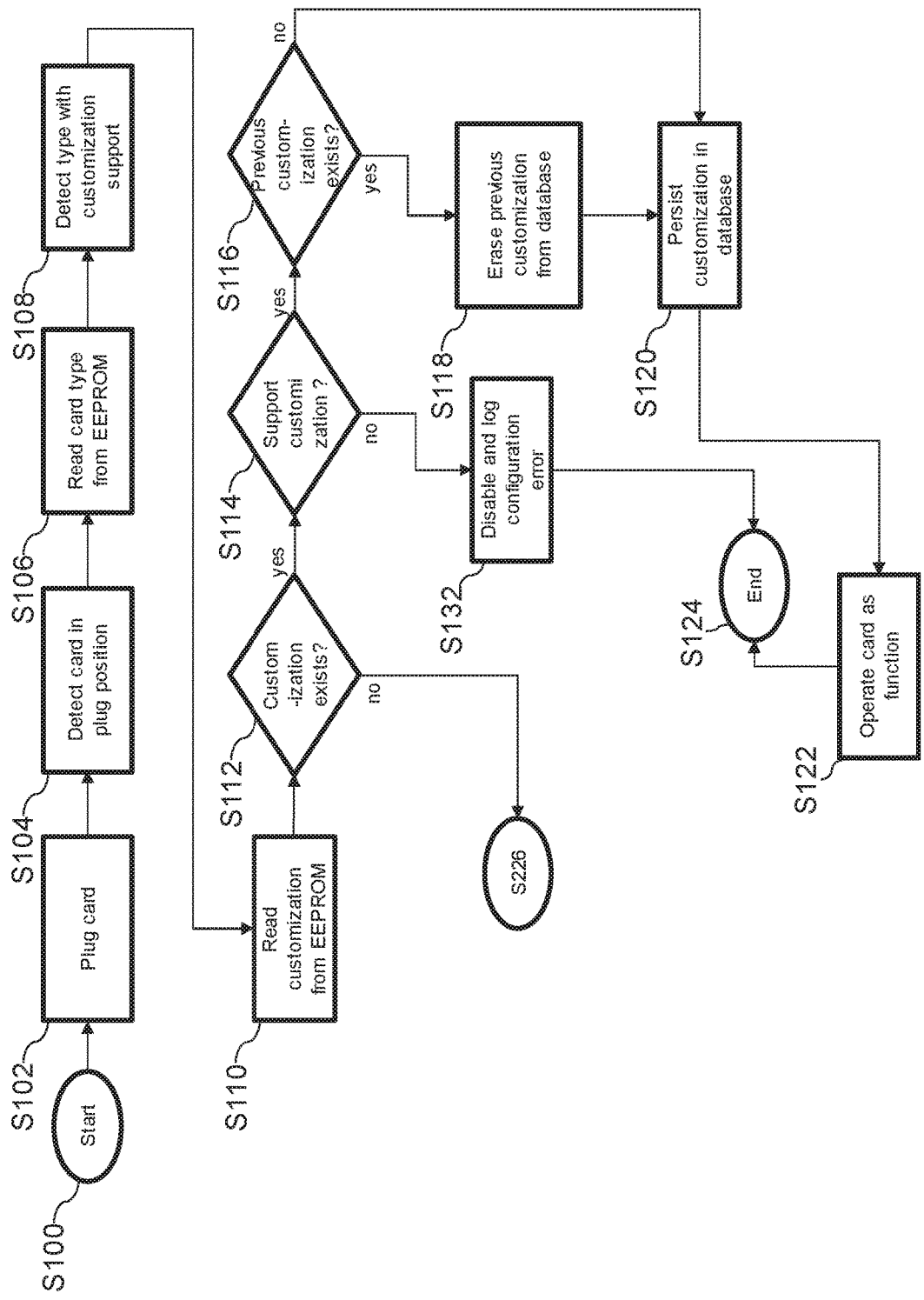
FIG. 2 depicts a flowchart of a firmware implementation for adding a new component to a data processing system according to an embodiment of the invention.

FIG. 2 depicts a flowchart of a firmware implementation for adding a new component 10 to a data processing system 210 according to an embodiment of the invention. The hardware and firmware schematics may be implemented as depicted in FIG. 1.

According to the embodiment of the invention, the method comprises adding the new component 10 to a specific location 20 of the data processing system 210; detecting the component 10 in the specific location 20 by the firmware 32; reading a type 18 of the component 10 from the data storage 12 of the component 10; determining if this type of component 10 is supported with customization data 14; and if this is the case, reading customization data 14 from the data storage 12. The firmware 32 detects if a new component 10 is added to the data processing system 210.

The sequence for adding the new component 10 starts with step S100. A card as a new component 10 is plugged into a specific location 20 in step S102. The card 10 is detected by the firmware 32 in the plug position 20 in step S104.

The firmware 32 associates the customization data 14 of a newly added component 10 to its specific location 20 in the data processing system 210. In response to the detection of the newly added component 10 at the specific location 20 in the data processing system 210 its customization data 14 may be read from the data storage 12 and the persistent database 30 in the data processing system 210 may be queried to determine if the functional capabilities according to the customization data 14 are specified for this specific location 20. For this purpose in step S106 the card type may be read from the data storage 12 on the EEPROM. Next in step S108 it may be detected that it is a type with customization support, followed by reading customization data 14 from the data storage 12 in step S110.

Then it is queried in step S112 if customization data 14 exist in the data storage 12 on the EEPROM. If this is not the case the flow continues with step S226 described in FIG. 3 below.

The customization data 14 of the newly added component 10 are checked against the configuration rules 40 stored in the database 30. Thus, if customization data 14 exists it is checked in step S114 if customization is supported at the specific location 20 of the data processing system 210. If the functional capabilities are not specified for the specific location 20 in the data processing system 210, the respective functional capabilities of the component 10 at the specific location 20 are disabled. The sequence is ended by disabling the operation of the component 10, and logging the configuration error in step S132 and ending in step S124.

In response to the detection of the newly added component 10 with functional capabilities that are specified for the specific location 20 in the data processing system 210, the respective functional capabilities of this component 10 are enabled and the database 30 is queried if it contains any customization data 16 for the same specific location 20 in the data processing system 210 already. Thus, if customization is supported at the specific location 20 it is queried in the database 30 if previous customization data 16 exists, step S116.

If this is the case, the previous customization data 16 is replaced with the customization data 14 of the newly added component 10 by erasing the previous customization data 16 from the database 30 in step S118. In step S120, the customization data 14 of the newly added component 10 is stored in the database 30 together with data 26 representing its specific location 20 in the data processing system 210. The functional capabilities are then enabled in the component 10 and the component 10 is then set to operational in step S122, followed by ending the sequence in step S124.

This method by this way also allows for moving a component 10 with customization data 14 from one specific location 20 to another specific location 22, 24 or even to another data processing system 210.

Figure 3:
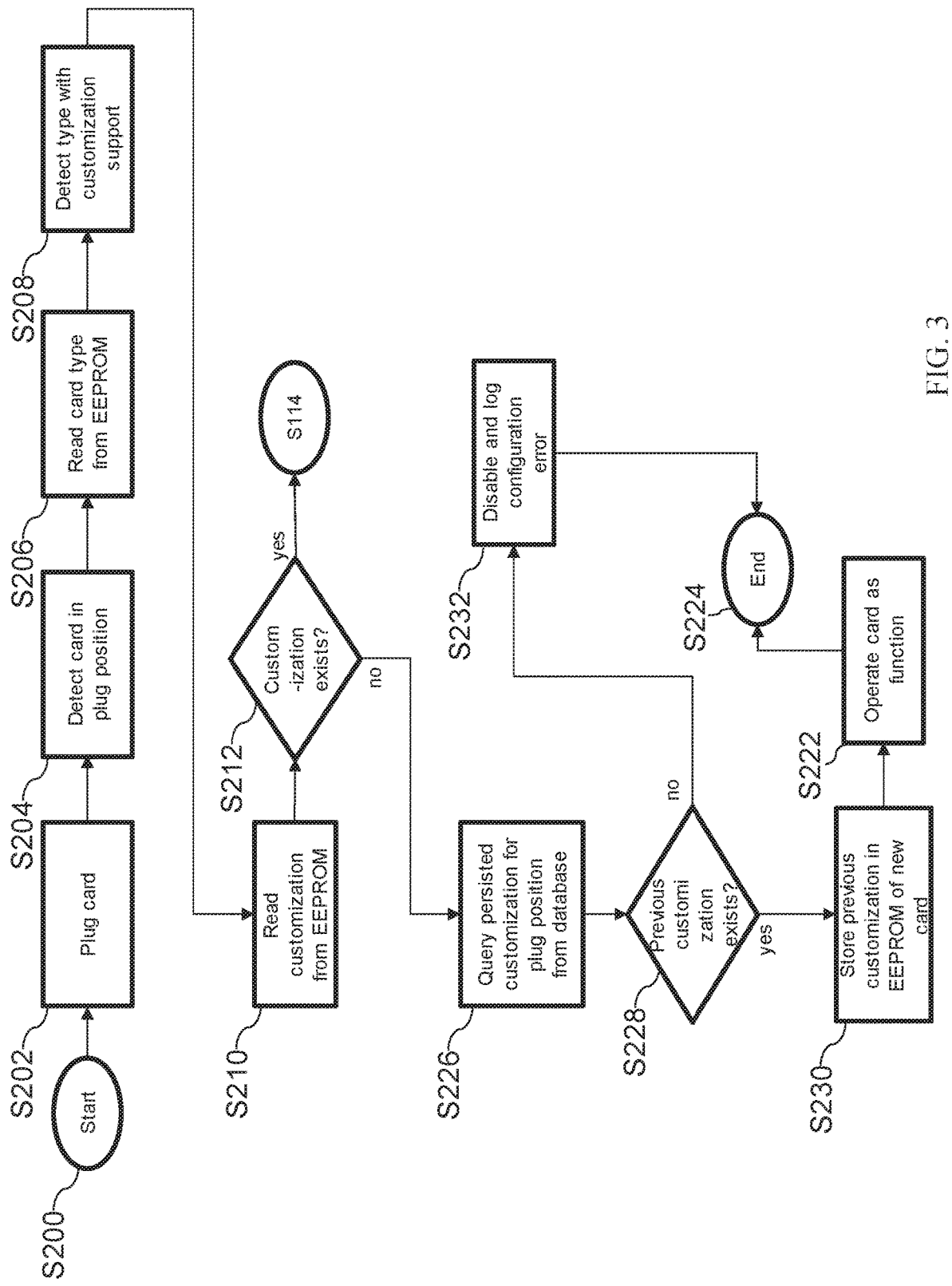
FIG. 3 depicts a flowchart of a firmware implementation for replacing a component in a data processing system according to an embodiment of the invention.

FIG. 3 depicts a flowchart of a firmware implementation for replacing a component 10 in a data processing system 210 according to an embodiment of the invention. The hardware and firmware schematics may be implemented as depicted in FIG. 1.

According to an embodiment of the invention a potentially defective component of the data processing system 210 may be replaced with a newly added component 10 where the data storage 12 of the component 10 does not contain customization data 14, such a component 10 being a general usage spare component. For replacing the potentially defective component of the data processing system 210 the new component 10 without customization data 14 may be added to the same specific location 20 as the potentially defective component.

The sequence in FIG. 3 then starts with step S200. The steps S202 to S212 with plugging in the component 10 and reading component type and customization data 14 correspond to steps S102 to S112 described with the sequence in FIG. 2 and are therefore not described in more details any more.

If a component 10 with customization data 14 was used, the sequence proceeding with step S114 described in FIG. 2 would be applicable.

The firmware 32 checks a last known type of component 10 being used in the same specific location 20 of the data processing system 210. In response to detecting a newly added component 10 where the data storage 12 of the component 10 does not contain customization data 14 (step S212), the database 30 is queried, if it contains customization data 16 for the same specific location 20 in the data processing system 210 already, steps 226 and S228. If this is the case, the customization data 16 are stored in step S230 in the data storage 12 of the newly added component 10, followed by enabling the component 10 in step S222 to operate with the same functional capabilities as a component with the previous customization data 16 at the specific location 20.

If the database 30 does not contain previous customization data 16 for the same location 20, the component 10 at the specific location 20 is disabled in step S232, followed by ending the sequence in step S224.

Figure 4:
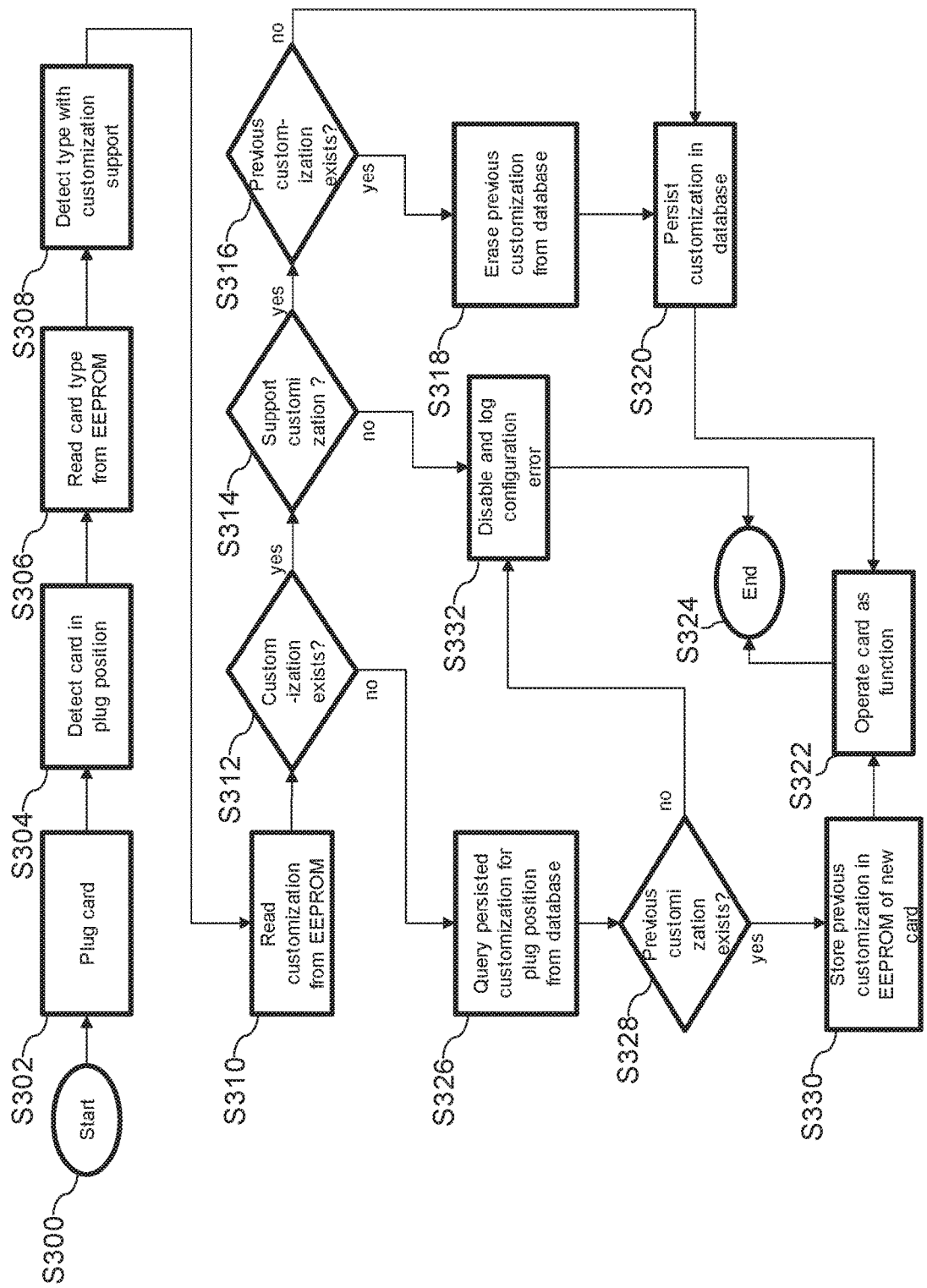
FIG. 4 depicts a flowchart of a firmware implementation for adding and replacing a component in a data processing system according to an embodiment of the invention.

FIG. 4 depicts an overall flowchart of a firmware implementation for adding and replacing a component 10 in a data processing system 210 according to an embodiment of the invention. The hardware and firmware schematics may be implemented as depicted in FIG. 1. Components 10 may be added to the data processing system 210 where the data storage 12 of the component 10 may contain customization data 14 or may not contain customization data 14.

The sequence for adding the new component 10 starts with step S300. A card as a new component 10 is plugged into a specific location 20 in step S302. The card 10 is detected by the firmware 32 in the plug position 20 in step S304.

The firmware 32 associates the customization data 14 of a newly added component 10 to its specific location 20 in the data processing system 210. In response to the detection of the newly added component 10 at the specific location 20 in the data processing system 210 its customization data 14 may be read from the data storage 12 and the persistent database 30 in the data processing system 210 may be queried to determine if the functional capabilities according to the customization data 14 are specified for this specific location 20. For this purpose in step S306 the card type may be read from the data storage 12 on the EEPROM. Next in step S308 it may be detected that it is a type with customization support, followed by reading customization data 14 from the data storage 12 in step S310.

Then it is queried in step S312 if customization data 14 exist in the data storage 12 on the EEPROM. The customization data 14 of the newly added component 10 are checked against the configuration rules 40 stored in the database 30. Thus, if customization data 14 exist it is checked in step S314 if customization is supported at the specific location 20 of the data processing system 210. If the functional capabilities are not specified for the specific location 20 in the data processing system 210, the respective functional capabilities of the component 10 at the specific location 20 are disabled. The sequence is ended by disabling the operation of the component 10, and logging the configuration error in step S332 and ending in step S324.

In response to the detection of the newly added component 10 with functional capabilities that are specified for the specific location 20 in the data processing system 210, the respective functional capabilities of this component 10 are enabled and the database 30 is queried if it contains any customization data 16 for the same specific location 20 in the data processing system 210 already. Thus, if customization is supported at the specific location 20 it is queried in the database 30 if previous customization data 16 exist, step S316.

If this is the case, the previous customization data 16 is replaced with the customization data 14 of the newly added component 10 by erasing the previous customization data 16 from the database 30 in step S318. In step S320 the customization data 14 of the newly added component 10 is stored in the database 30 together with data 26 representing its specific location 20 in the data processing system 210. The functional capabilities are then enabled in the component 10 and the component 10 is then set to operational in step S322, followed by ending the sequence in step S324.

This method by this way also allows for moving a component 10 with customization data 14 from one specific location 20 to another specific location 22, 24 or even to another data processing system 210.

If a new component 10 is added where the data storage 12 does not contain customization data 14, another branch of the sequence is followed. The firmware 32 checks a last known type of component 10 being used in the same specific location 20 of the data processing system 210. In response to detecting a newly added component 10 where the data storage 12 of the component 10 does not contain customization data 14 (step S312), the database 30 is queried, if it contains customization data 16 for the same specific location 20 in the data processing system 210 already, steps S326 and S328. If this is the case, the customization data 16 are stored in step S330 in the data storage 12 of the newly added component 10, followed by enabling the component 10 in step S322 to operate with the same functional capabilities as a component with the previous customization data 16 at the specific location 20.

If the database 30 does not contain previous customization data 16 for the same location 20, the component 10 at the specific location 20 is disabled in step S332, followed by ending the sequence in step S224.

Figure 5:
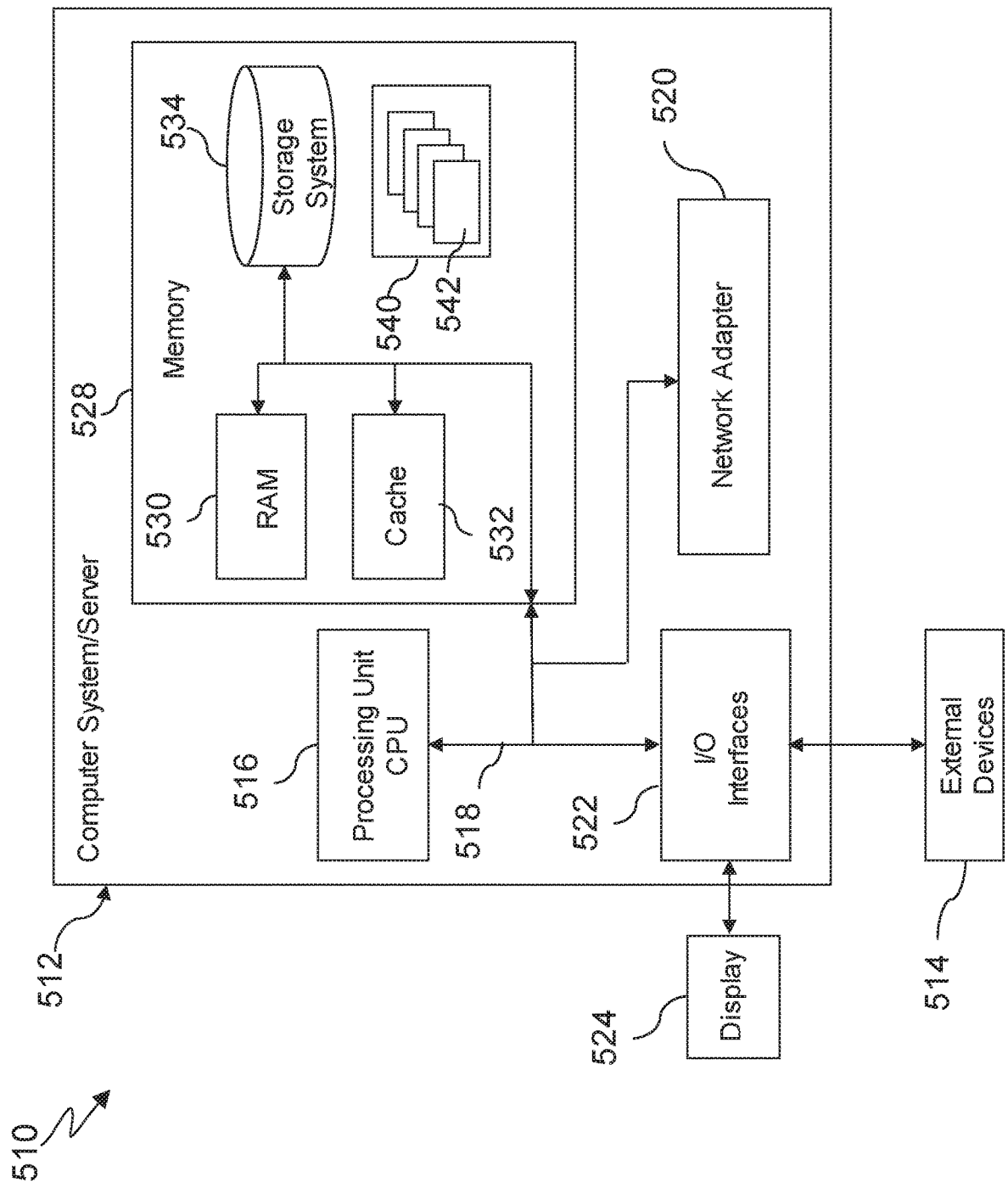
FIG. 5 depicts an example embodiment of a data processing system for executing a method according to the invention.

Referring now to FIG. 5, a schematic of an example of a data processing system 510 is shown. Data processing system 510 is only one example of a suitable data processing system and is not intended to suggest any limitation as to the scope of use or functionality of embodiments of the invention described herein. Regardless, data processing system 510 is capable of being implemented and/or performing any of the functionality set forth herein above.

In data processing system 510 there is a computer system/server 512, which is operational with numerous other general-purpose or special-purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in data processing system 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

REFERENCE NUMERALS

10 component
12 data storage
14 customization data
16 customization data
18 card type
20 location
22 location
24 location
26 data representing location
30 database
32 firmware
34 controller
36 IO drawer
40 configuration rules
510 data processing system
512 computer system/server
514 external devices
516 CPU/data processing unit
518 IO Bus
520 network adapter
522 IO interfaces
524 display
528 memory
530 RAM
532 cache
534 storage system
540 program/utility
542 program modules
S100 Start
S102 Add component
S104 Detect newly added component
S106 Read component type from data storage
S108 Detect component type with customization support
S110 Read customization from data storage
S112 Check if customization exists
S114 Check if customization is supported
S116 Check if previous customization exists
S118 Erase previous customization from the database
S120 Store customization in the database
S122 Set component to operational
S124 End
S132 Disable functional capabilities and log configuration error
S200 Start
S202 Add component
S204 Detect newly added component
S206 Read component type from data storage
S208 Detect component type with customization support
S210 Read customization from data storage
S212 Check if customization exists
S222 Set component to operational
S224 End
S226 Query customization data for specific location from the persistent database
S228 Check if previous customization exists
S230 Store previous customization data in the data storage of the new component
S232 Disable functional capabilities and log configuration error
S300 Start
S302 Add component S304 Detect newly added component
S306 Read component type from data storage
S308 Detect component type with customization support
S310 Read customization from data storage
S312 Check if customization exists
S314 Check if customization is supported
S316 Check if previous customization exists
S318 Erase previous customization from the database
S320 Store customization in the database
S322 Set component to operational
S324 End
S326 Query customization data for specific location from the persistent database
S328 Check if previous customization exists
S330 Store previous customization data in the data storage of the new component
S332 Disable functional capabilities and log configuration error

What is claimed is:

1. A computer implemented method comprising:
   detecting a newly added component at a specific location in a data processing system and customization data indicating respective functional capabilities for the newly added component;
   determining a last known type of component used in the specific location;
   determining whether previous customization data exists in data storage, wherein the previous customization data indicates one or more functional capabilities corresponding to the last known type of component used in the specific location in the data processing system; and
   responsive to determining that previous customization data exists in data storage:
      erasing the previous customization data in data storage;
      enabling the respective functional capabilities of the newly added component; and
      replacing the previous customization data by storing the customization data of the newly added component together with data representing the specific location within the data processing system of the newly added component.

2. The method according to claim 1, further comprising:
   for a second newly added component, determining whether customization data indicating one or more functional capabilities exists in data storage for the second newly added component and for a component similar to the second newly added component at the specific location; and
   disabling the second newly added component at the specific location responsive to determining the data storage does not contain customization data for the second newly added component and the data storage does not contain customization data for the component similar to the second newly added component.

3. The method according to claim 1, further comprising:
   for a second newly added component, determining whether customization data indicating one or more functional capabilities exists in data storage for the second newly added component and for a component similar to the second newly added component at the specific location; and
   storing the customization data in the data storage of the second newly added component and enabling the respective functional capabilities of the second newly added component responsive to determining the data storage of the component does not contain customization data and the data storage contains customization data.

4. The method according to claim 3, wherein in response to detection of the second newly added component where the data storage of the component does not contain customization data, the second newly added component is enabled to operate with the same functional capabilities as a component with previous customization data at the specific location.

5. The method according to claim 1, further comprising:
   adding a second newly added component to a specific location of the data processing system;
   detecting the second newly added component in the specific location;
   reading a type of the second newly added component from the data storage of the component;
   determining whether the type of the second newly added component is supported with customization data; and
   responsive to determining the type of second newly added component is supported with customization data, reading customization data from the data storage.

6. The method according to claim 1, further comprising detecting if a new component is added to the data processing system.

7. The method according to claim 1, wherein the data storage of the data processing system comprises configuration rules for possible customization data of replaceable components.

8. The method according to claim 7, further comprising checking the customization data of the newly added component against the configuration rules stored in the data storage.

9. The method according to claim 1, wherein the newly added component is an input/output card.

10. A computer program product for replacing components of a data processing system comprising replaceable components wherein the replaceable components comprise a data storage for computer-readable customization data representing respective functional capabilities, and wherein the functional capabilities can be enabled or disabled for use in the data processing system, the computer program product comprising:
    one or more computer readable storage media and program instructions stored on the one or more computer readable storage media, the program instructions comprising instructions to:
       detect a newly added component at a specific location in the data processing system and customization data indicating respective functional capabilities for the newly added component;
       determine a last known type of component used in the specific location;
       determine whether previous customization data exists in data storage, wherein the previous customization data indicates one or more functional capabilities corresponding to the last known type of component used in the specific location in the data processing system; and
       responsive to determining that previous customization data exists in data storage:
          erase the previous customization data in data storage;
          enable the respective functional capabilities of the newly added component; and
          replace the previous customization data by storing the customization data of the newly added component together with data representing the specific location within the data processing system of the newly added component.

11. The computer program product according to claim 10, wherein the newly added component is an input/output card.

12. The computer program product according to claim 10, wherein the data storage of the data processing system comprises configuration rules for possible customization data of replaceable components.

13. A computer system for replacing components of a data processing system comprising replaceable components wherein the replaceable components comprise a data storage for computer-readable customization data representing respective functional capabilities, and wherein the functional capabilities can be enabled or disabled for use in the data processing system, the computer program product comprising:
one or more computer processors;
one or more computer-readable storage media;
program instructions stored on the computer-readable storage media for execution by at least one of the one or more processors, the program instructions comprising instructions to:
detect a newly added component at a specific location in the data processing system and customization data indicating respective functional capabilities for the newly added component;
determine a last known type of component used in the specific location;
determine whether previous customization data exists in data storage, wherein the previous customization data indicates one or more functional capabilities corresponding to the last known type of component used in the specific location in the data processing system; and
responsive to determining that previous customization data exists in data storage:
erase the previous customization data in data storage;
enable the respective functional capabilities of the newly added component; and
replace the previous customization data by storing the customization data of the newly added component together with data representing the specific location within the data processing system of the newly added component.

14. The computer system according to claim 13, wherein the data storage of the data processing system comprises configuration rules for possible customization data of replaceable components.

15. The computer program product according to claim 10, the program instructions further comprising instructions to:
for a second newly added component, determine whether customization data indicating one or more functional capabilities exists in data storage for the second newly added component and for a component similar to the second newly added component at the specific location; and
store the customization data in the data storage of the second newly added component and enabling the respective functional capabilities of the second newly added component responsive to determining the data storage of the component does not contain customization data and the data storage contains customization data.

16. The computer system according to claim 13, the program instructions further comprising instructions to:
for a second newly added component, determine whether customization data indicating one or more functional capabilities exists in data storage for the second newly added component and for a component similar to the second newly added component at the specific location; and
store the customization data in the data storage of the second newly added component and enabling the respective functional capabilities of the second newly added component responsive to determining the data storage of the component does not contain customization data and the data storage contains customization data.

17. The computer system according to claim 13, wherein the newly added component is an input/output card.

18. The computer program product of claim 10, wherein the data storage of the data processing system comprises configuration rules for possible customization data of replaceable components.

19. The computer system of claim 13, wherein the data storage of the data processing system comprises configuration rules for possible customization data of replaceable components.

* * * * *